Oct. 30, 1923.

G. W. FAIRBOURN

WEEDER

Filed Jan. 12, 1922

WITNESSES
H. J. Walker
J. J. Foster

INVENTOR
G. W. Fairbourn
BY
ATTORNEYS

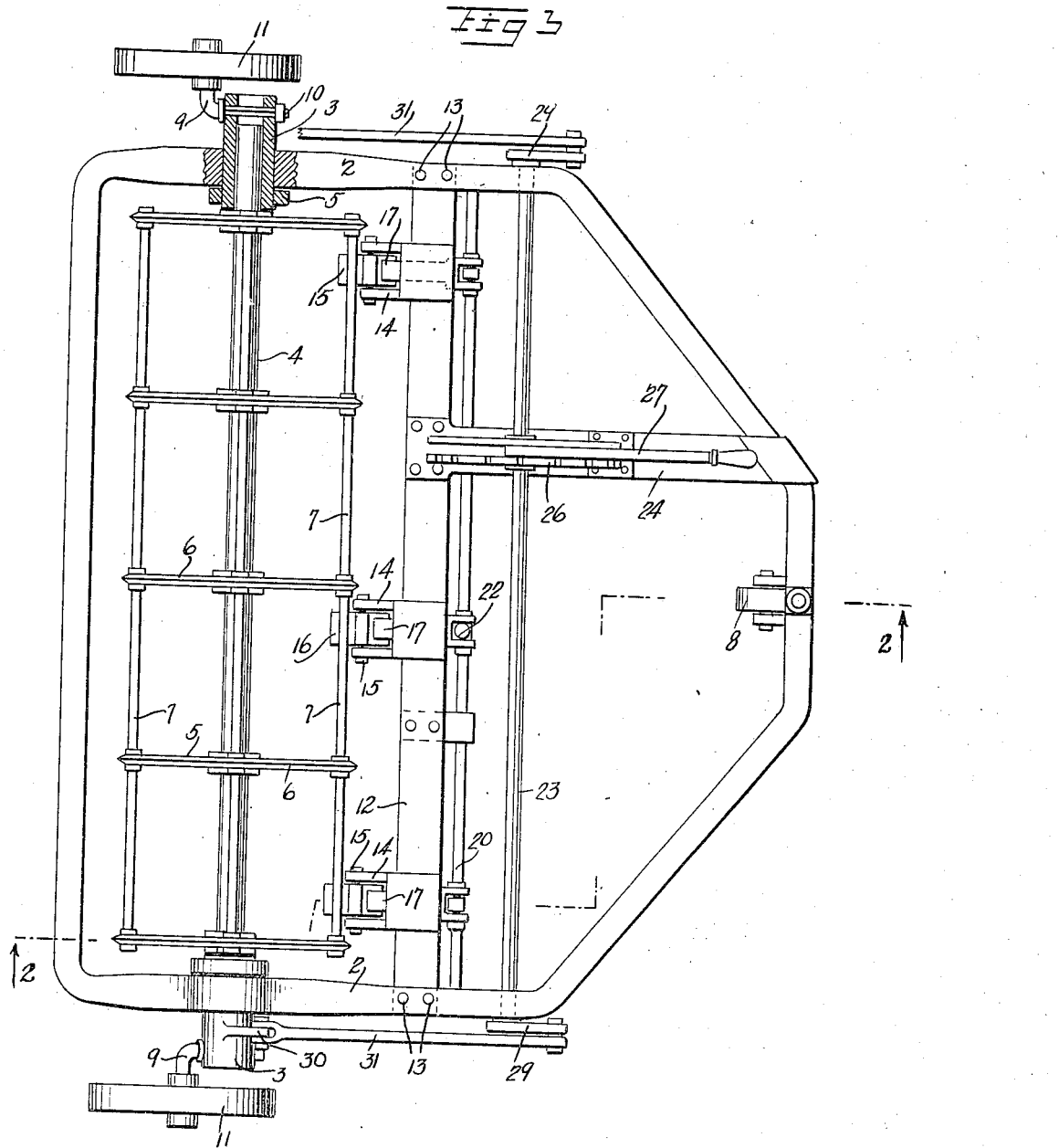

Patented Oct. 30, 1923.

1,472,749

UNITED STATES PATENT OFFICE.

GEORGE W. FAIRBOURN, OF SALT LAKE CITY, UTAH.

WEEDER.

Application filed January 12, 1922. Serial No. 528,749.

*To all whom it may concern:*

Be it known that I, GEORGE W. FAIRBOURN, a citizen of the United States, and a resident of Salt Lake City, in the county of Salt Lake and State of Utah, have invented a new and Improved Weeder, of which the following is a full, clear, and exact description.

This invention relates to improvements in weeders, an object of the invention being to provide a device of this character which is so constructed that it is unnecessary to stop the weeding operation in order to remove weeds from the weeder bars or weeding mechanism.

A further object is to provide a weeder which is dragged over the ground, and at the same time to provide improved means for rolling the weeder over the ground when the same is not in use, or in other words, to provide a device of this character, in which the weight of the machine may be selectively supported either upon the weeding mechanism or upon traction wheels.

A still further object is to provide a device of the character stated, which will be simple and practical in construction, strong, durable and efficient in use, unlikely to get out of order, and comparatively inexpensive to manufacture.

With these and other objects in view, the invention consists in certain novel features of construction and combinations and arrangements of parts as will be more fully hereinafter described and pointed out in the claims.

In the accompanying drawings:

Figure 3 is a top plan view of the weeder with parts broken away and in section for clearness.

Figure 1:
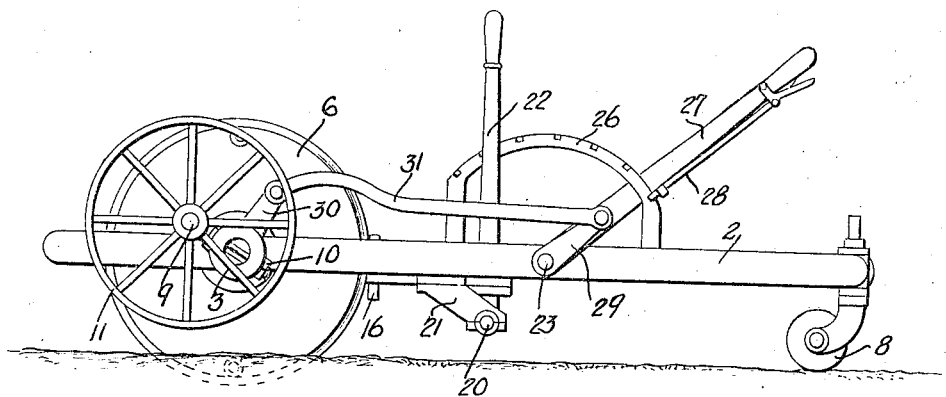
Figure 1 is a view in side elevation of my improved weeder.
Figure 2:
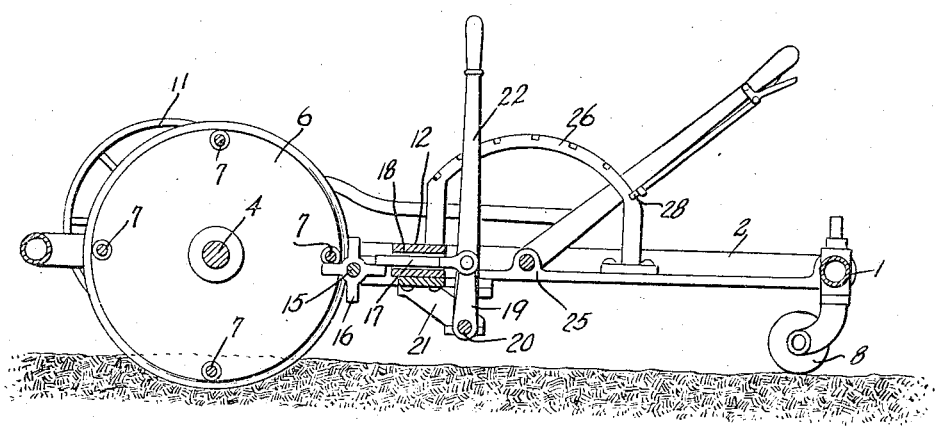
Figure 2 is a view in longitudinal section therethrough on the staggered line 2—2 of Figure 3.

Referring in detail to the drawings, I have used the reference numeral 1 to designate the frame of my improved weeder. This frame includes a pair of side bars 2 in which are journaled a pair of hubs 3. A transverse shaft 4 has its ends mounted in the hubs and the hubs are held in the frames by the use of collars 5 secured around the same. The transverse shaft 4 provides mounting for a series of disks 6 having cutting edges, and weeder bars 7 connect the disks adjacent their peripheries. I preferably provide four of these weeder bars arranged at spaced intervals around the edges of the disks and adapted to dig into the ground and uproot weeds when the weeder is dragged over the ground.

The forward end of the weeder is mounted upon a relatively small traction wheel 8 so that the nose of the weeder will not dig into the ground as the device is pulled.

Laterally extending short stub shafts 9 are carried by the hubs 3, said shafts being bolted or otherwise secured to the hubs, as indicated at 10. These shafts provide mounting for traction wheels 11, the center of these wheels being out of alignment with the center of the disks 6.

A transverse cross beam 12 is located just forward of the revolving disks 6 and has its ends secured to the said bars 2 of the frame 1, as seen at 13. Bifurcated brackets 14 are fixed to and extend rearwardly from the cross beam 12. Shafts 15 mounted within the brackets carry star wheels 16, the blades of which are engageable with the weeder bars to hold the disks 6 against rotation. In order to lock the star wheels against turning, for the purpose of holding the weeder bars, locking members 17 are provided, these members being movable through openings 18 in the cross beam and engageable with the blades of the star wheels to prevent rotation thereof. The forward ends of the locking members 17 are pivotally connected to crank arms 19 carried by a transverse shaft 20. The shaft 20 is mounted in hanging bearings 21 secured to the under face of the cross beam. A lever 22 secured at its lower end to the shaft 20 is used to manually operate the shaft to effect retraction of the locking members 18 through the medium of the crank arms 19.

Still another and sturdier crank shaft 23 has its ends journaled in the side bars 2 of the frame 1 forwardly of the mechanism above described. The bearings of this shaft are further strengthened by the provision of a longitudinal platform 24 connecting the cross beam 12 and the forward end of the frame 1 and carrying a bearing block 25 through which the shaft 23 passes. A notched sector bar 26 is secured upon the platform 24 and a hand lever 27 fixed to the shaft 23 for operating the same carries a spring held dog 28 engageable in the notches of the sector bar to hold the shaft 23 against movement in either direction. The ends of the shaft 23 extend through the side bars of the frame 1 and crank arms 29 are fixed to the projecting ends of this shaft. In like manner, crank arms 30 are fixed to the hubs 3. Links 31 connect the crank arms 29 and 30 to effect turning of the hubs 3 upon operation of the lever 27.

It will of course be understood that the weeder may be animal drawn or may be pulled by a tractor, and its operation is as follows: In order to cause the weeder to travel over the ground without performing the weeding operation, it is merely necessary to throw the lever 27 to its full rearward position operating through the mechanism described to turn the hubs 3, thereby swinging the shafts 9, bringing the traction wheels 11 into contact with the ground and lifting the disks 6 and weeder bars 7 clear of the ground. When it becomes desirable to operate the weeder bars, the lever 27 is thrown in the opposite direction allowing the disks 6 and bars 7 to engage the ground, at the same time lifting the traction wheels clear of the ground. The weight of the machine will dig one of the weeder bars into the ground. The star wheels 16 are locked by the mechanism above described to prevent rotation of the disks and as the device is dragged, the weeder bar uproots weeds. The depth to which the weeder bar penetrates the surface of the ground may of course be regulated by the throw of the lever 27.

After one weeder bar becomes clogged with weeds, it is a very simple matter to bring the next weeder bar into operation by merely releasing the star wheels permitting the disks to turn until the next bar engages the ground and then locking the star wheels again.

Although I have illustrated one of the preferred embodiments of my invention, it will be obvious that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In a weeder, weeder bars adapted to be dragged in the ground, cutting elements intermediate the ends of said bars, traction wheels, and means for selectively supporting said weeder on the weeder bars or the traction wheels.

2. In a weeder, a shaft, a plurality of ground engaging weeder bars spaced from and arranged around said shaft, cutting elements rigidly connecting the shaft and weeder bars, and means engageable with the weeder bars to hold said shaft against rotation when one weeder bar is dragging in the ground.

3. In a weeder, a shaft, a plurality of cutting disks fixed to the shaft, and ground engaging weeder bars parallel to the shaft and connecting the disks adjacent their edges.

4. In a weeder, a shaft, a plurality of disks fixed to the shaft, ground engaging weeder bars parallel to the shaft and connecting the disks adjacent their edges, and said disks including sharp ground engaging edges.

5. In a weeder, a frame, hubs journaled in the frame, a shaft mounted to turn in the hubs, disks fixed to the shaft, weeder bars connecting the edges of the disks and adapted to engage in the ground, stub shafts fixed to and offset from said hubs, and traction wheels mounted on the stub shafts.

6. In a weeder, a frame, hubs journaled in the frame, a shaft mounted to turn in the hubs, disks fixed to the shaft, weeder bars connecting the edges of the disks and adapted to engage in the ground, stub shafts fixed to and offset from said hubs, traction wheels mounted on the stub shafts, and means for turning the hubs to bring the traction wheels into contact with the ground and lift said weeder bars out of engagement with the ground.

7. In a weeder, a frame, hubs journaled in the frame, a shaft mounted to turn in the hubs, disks fixed to the shaft, weeder bars connecting the edges of the disks and adapted to engage in the ground, stub shafts fixed to and offset from said hubs, traction wheels mounted on the stub shafts, means for turning the hubs to bring the traction wheels into contact with the ground and lift said weeder bars out of engagement with the ground, said means including crank arms connecting the hubs, a lever, and means connecting the lever and crank arms.

8. In a weeder, a frame, a transversely extending shaft, disks fixed to the shaft, weeder bars carried by the disks and adapted to drag in the ground, a cross beam connected to the frame, brackets secured to the cross beam, star wheels mounted in the brackets and located in the path of travel of the weeder bars when the disks are turned, and means for locking the star wheels to effect dragging of a weeder bar.

9. In a weeder, a frame, a transversely extending shaft, disks fixed to the shaft, weeder bars carried by the disks and adapted to drag in the ground, a cross beam connected to the frame, brackets secured to the cross beam, star wheels mounted in the brackets and located in the path of travel of the weeder bars when the disks are turned, and means for locking the star wheels to effect dragging of a weeder bar, said means including locking members movable through the cross beam and engageable with the star wheels to lock the same against rotation, whereby to prevent turning of the disks.

10. In a weeder, a shaft, a plurality of weeder bars spaced from and arranged around said shaft, discs uniting the shaft and weeder bars, said discs extending beyond the weeder bars and terminating in a cutting edge, and means to hold said shaft against rotation when one of said bars is dragging in the ground.

GEORGE W. FAIRBOURN.